(12) United States Patent
Yamamoto (10) Patent No.: US 11,057,594 B2
(45) Date of Patent: Jul. 6, 2021

(54) LIGHT EMISSION CONTROL DEVICE, LIGHT SOURCE DEVICE, AND PROJECTION-TYPE VIDEO DISPLAY DEVICE

(71) Applicant: Seiko Epson Corporation, Tokyo (JP)

(72) Inventor: Yuki Yamamoto, Chino (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/879,890

(22) Filed: May 21, 2020

(65) Prior Publication Data

US 2020/0374494 A1 Nov. 26, 2020

(30) Foreign Application Priority Data

May 22, 2019 (JP) .............................. JP2019-095785

(51) Int. Cl.
*H04N 9/31* (2006.01)
*H05B 41/295* (2006.01)
(Continued)

(52) U.S. Cl.
CPC ......... *H04N 9/3123* (2013.01); *H04N 9/3161* (2013.01); *H05B 39/09* (2013.01);
(Continued)

(58) Field of Classification Search
CPC .... H04N 9/3123; H04N 9/3161; H05B 41/28; H05B 41/295; H05B 41/2827;
(Continued)

(56) References Cited

U.S. PATENT DOCUMENTS

2008/0225559 A1* 9/2008 Yanada .................... H02M 1/32
363/44
2008/0284929 A1* 11/2008 Kimura ................. G02F 1/1368
349/38
(Continued)

FOREIGN PATENT DOCUMENTS

JP  2008-228538 A  9/2008
JP  2008228538 A * 9/2008 .............. H02M 1/32
(Continued)

*Primary Examiner* — John W Miller
*Assistant Examiner* — Omer Khalid
(74) *Attorney, Agent, or Firm* — Harness, Dickey & Pierce, P.L.C.

(57) ABSTRACT

A light emission control device controls a first switching element of a light source circuit including a first resistor, a light emitting element, and the first switching element coupled in series between a first power supply node and a second power supply node set to a lower potential than the first power supply node. The light emission control device includes a second detection circuit that compares a first potential difference between both ends of the first resistor with a determination value, a light emission control circuit that outputs a first control signal that controls on/off of the first switching element, and a logic determination circuit that determines whether or not the first switching element is short-circuited. The light emission control circuit sets the first control signal to a first drive stoppage state that inactivates the first control signal, and when the second detection circuit has detected that the first potential difference is larger than the determination value, the logic determination circuit outputs an error signal.

5 Claims, 7 Drawing Sheets

(51) Int. Cl.
  *H05B 39/09* (2006.01)
  *H05B 41/28* (2006.01)
  *H05B 41/34* (2006.01)
  *H05B 41/392* (2006.01)

(52) U.S. Cl.
  CPC ............ *H05B 41/28* (2013.01); *H05B 41/295* (2013.01); *H05B 41/34* (2013.01); *H05B 41/3925* (2013.01)

(58) Field of Classification Search
  CPC ............ H05B 41/3925; H05B 41/2828; H05B 41/3921; H05B 41/3927; H05B 33/0803; H05B 33/0827; H05B 33/0809; H05B 33/0821; F21Y 2101/202; Y02B 20/202
  USPC ........................................................ 348/744
  See application file for complete search history.

(56) References Cited

U.S. PATENT DOCUMENTS

| | | | | |
|---|---|---|---|---|
| 2010/0213857 A1* | 8/2010 | Fan | ......................... | H05B 45/46 315/186 |
| 2012/0235574 A1* | 9/2012 | Sumi | .................. | H05B 41/2985 315/131 |
| 2018/0180978 A1* | 6/2018 | Yamada | ................. | H05B 45/10 |
| 2018/0307131 A1 | 10/2018 | Yamada et al. | | |

FOREIGN PATENT DOCUMENTS

| | | | |
|---|---|---|---|
| JP | 2018-106862 A | | 7/2018 |
| JP | 2018106862 A | * | 7/2018 |

* cited by examiner

LIGHT EMISSION CONTROL DEVICE, LIGHT SOURCE DEVICE, AND PROJECTION-TYPE VIDEO DISPLAY DEVICE

The present application is based on, and claims priority from JP Application Serial Number 2019-095785, filed May 22, 2019, the disclosure of which is hereby incorporated by reference herein in its entirety.

BACKGROUND

1. Technical Field

The present disclosure relates to a light emission control device, a light source device, and a projection-type video display device, and the like.

2. Related Art

A light emission control device that controls a light source used in a projector or the like is known. The light emission control device performs light control of a light emitting element by two methods, specifically a current light control and a PWM (Pulse Width Modulation) light control.

In the current light control, the light emission control device performs switching regulation control by controlling on/off of a transistor that causes current to flow through an inductor. By causing a constant current obtained by the switching regulation control to flow through the light emitting element, the light emission control device controls the light emission amount of the light emitting element. At this time, the light emission control device detects a current that flows through the light emitting element and a current that flows through a switching regulation transistor, and performs switching regulation control based on those currents.

In the PWM light control, a light emission control device controls on/off of a switching element serving as a first switching element for PWM light control coupled in series to a light emitting element, thereby cutting off or coupling a current path where current flows through the light emitting element. There is a method in which in this way, a light source does not appear to the naked eye to be blinking, but rather the brightness of the light source appears to be averaged over time. Related art of such a light emission control device is disclosed in, for example, JP-A-2018-106862.

In the light emission control device of JP-A-2018-106862, overcurrent detection is performed in order to avoid abnormalities or failures due to overcurrent. More specifically, overcurrent detection is performed with respect to a current that flows through the light emitting element, and an overcurrent that occurs in the light emitting element is addressed using the result of the overcurrent detection. However, there is a problem that a defect in which the first switching element serving as a PWM light control switching element is short-circuited cannot be detected only by performing overcurrent detection of the light emitting element.

SUMMARY

One aspect of the disclosure relates to a light emission control device that controls a first switching element of a light source circuit including a first resistor, a light emitting element, and the first switching element coupled in series between a first power supply node and a second power supply node set to a lower potential than the first power supply node, the light emission control device including: a second detection circuit that compares a first potential difference that is a potential difference between both ends of the first resistor with a determination value; a light emission control circuit that outputs a first control signal that controls on/off of the first switching element; and a logic determination circuit that determines whether or not the first switching element is short-circuited, where the light emission control circuit sets the first control signal to a first drive stoppage state that inactivates the first control signal, and when the second detection circuit has detected that the first potential difference is larger than the determination value, the logic determination circuit outputs an error signal.

In the above light emission control device, a configuration may be adopted in which the determination value is set within a range of voltage values corresponding to a current that flows in a range from $1/10$ or more to $9/10$ or less with respect to a lower limit value of a current amount that flows through the light emitting element during normal operation.

In the above light emission control device, a configuration may be adopted in which the light source circuit includes an inductor coupled between the second power supply node and the first switching element, a smoothing capacity coupled in parallel with the first resistor, the light emitting element, and the first switching element between the inductor and the first power supply node, a second switching element coupled between the inductor and the second power supply node, and a rectifier diode coupled in parallel with the first resistor, the light emitting element, the first switching element, and the inductor between the second switching element and the first power supply node, and the light emission control circuit outputs a second control signal that controls on/off of the second switching element, and sets the second control signal to a second drive stoppage state that inactivates the second control signal, and when the first control signal has also been set to the first drive stoppage state that inactivates the first control signal, the logic determination circuit outputs the error signal before the first potential difference becomes less than the determination value.

In the above light emission control device, a configuration may be adopted in which when outputting the error signal, the second control signal is fixed to an inactive state.

Another aspect of the disclosure relates to a light source device including the light emission control device and the light source circuit described above.

Another aspect of the disclosure relates to a projection-type video display device including the light source device described above and a processing device that controls the light source device.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

The following describes exemplary embodiments of the disclosure. Note that the embodiments described below do not unreasonably limit the scope of the disclosure described in the claims, and not all of the configurations described in these embodiments are necessary to solve problems addressed by the disclosure.

Embodiments

1. Light Source Device and Light Emission Control Device

Figure 1:
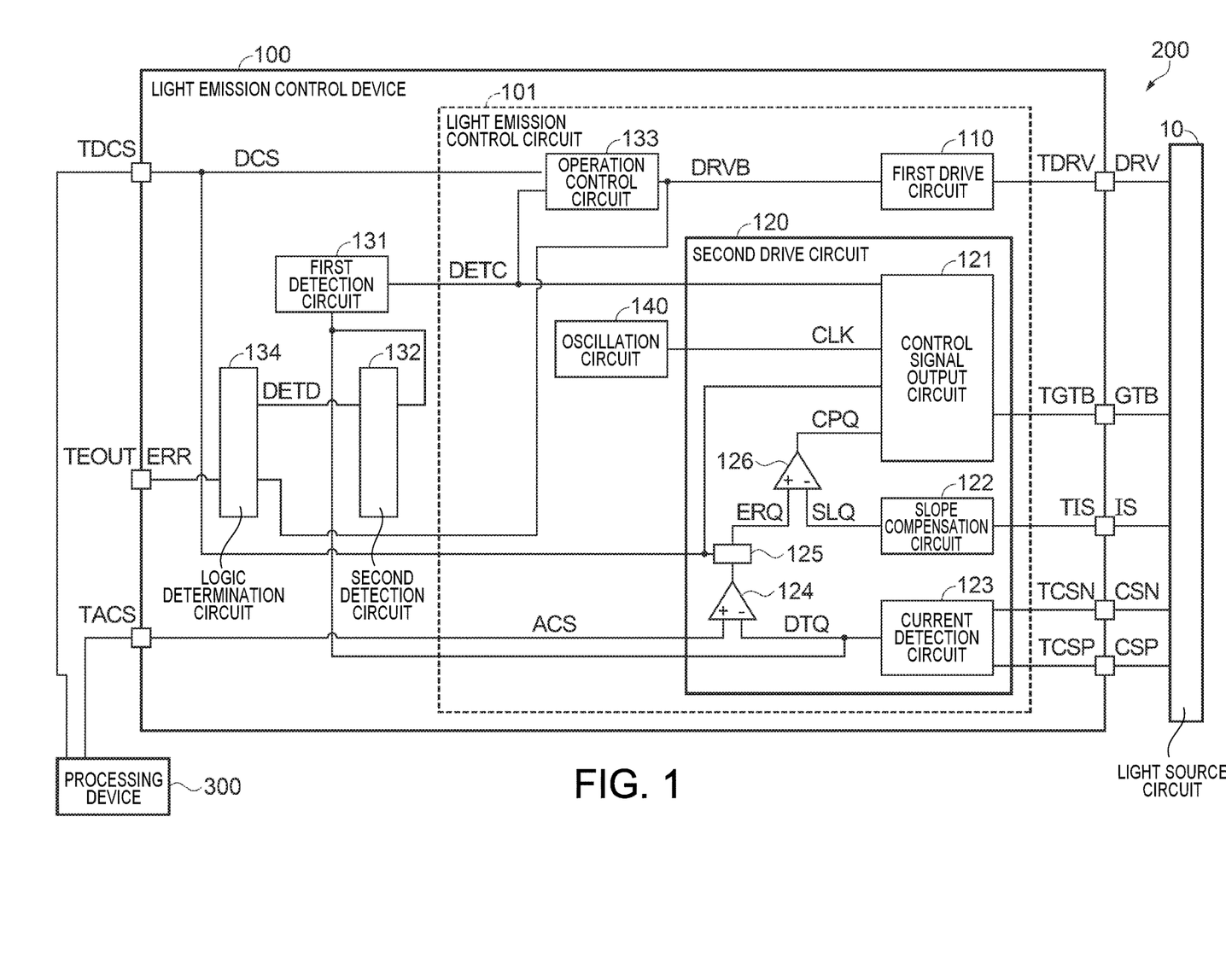
FIG. 1 is an electric block diagram showing a configuration of a light source device.
Figure 2:
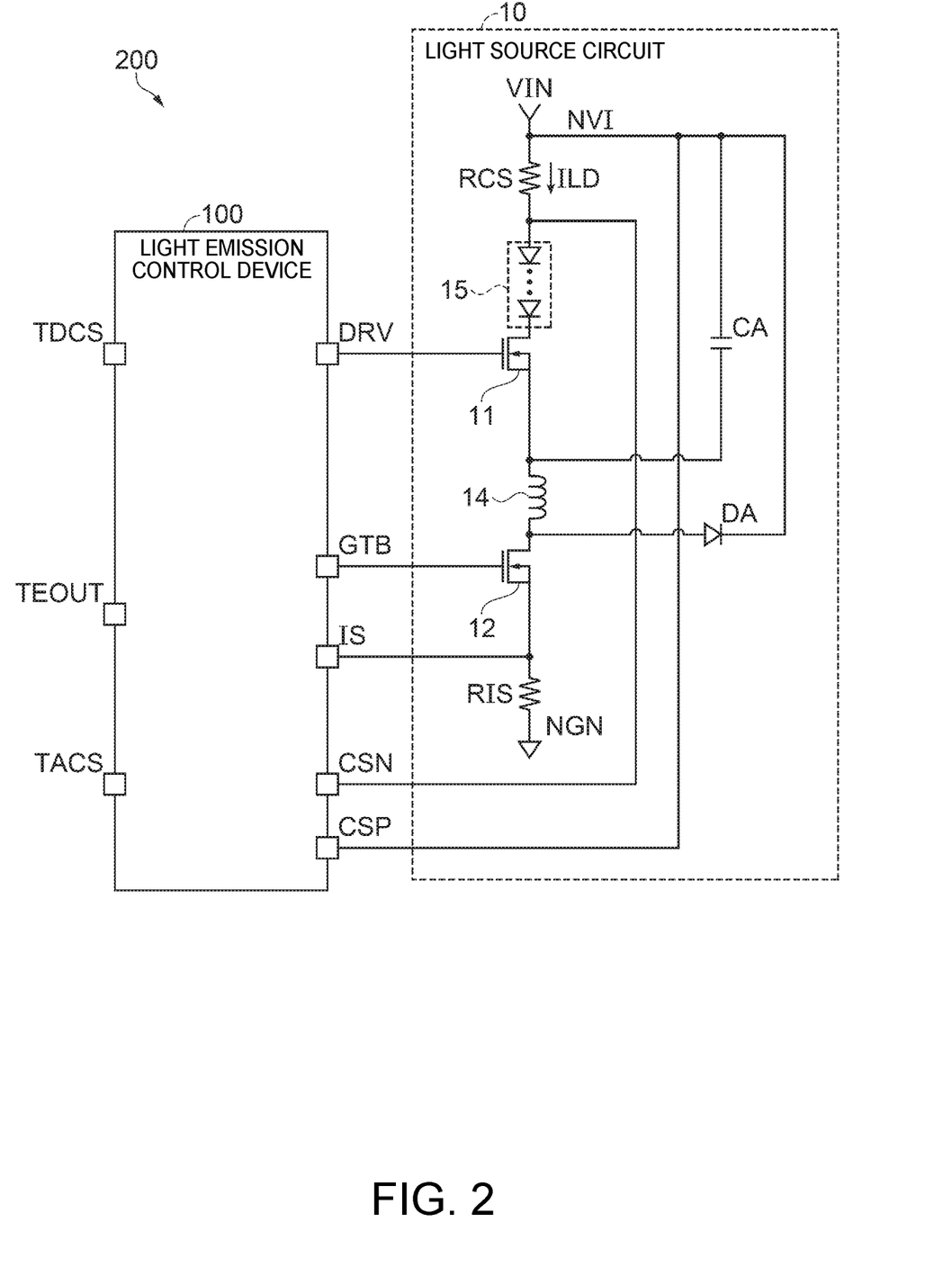
FIG. 2 is an electric block diagram showing a configuration of a light source device.

FIGS. 1 and 2 are electric block diagrams showing a configuration of a light source device. This light source device 200 includes a light source circuit 10 that is a light emitting element and its peripheral circuits, and a light emission control device 100 that controls light emission of the light emitting element. The light emission control device 100 is, for example, an integrated circuit device, and is realized by, for example, a semiconductor chip.

First, the configurations of the light source circuit 10 and the light emission control device 100 will be described with reference to FIGS. 1 and 2, and a PWM light control mode and a current light control mode will be described with reference to FIGS. 3 and 4.

As shown in FIG. 2, the light source circuit 10 includes a first resistor RCS coupled in series between a first power supply node NVI and a second power supply node NGN set to a lower potential than the first power supply node NVI, a light emitting element 15, and a first switching element 11.

Also, the light source circuit 10 includes an inductor 14 coupled between the second power supply node NGN and the first switching element 11, a smoothing capacity CA coupled in parallel with the first resistor RCS, the light emitting element 15, and the first switching element 11 between the inductor 14 and the first power supply node NVI, and a second switching element 12 coupled between the inductor 14 and the second power supply node NGN.

Also, the light source circuit 10 includes a rectifier diode DA coupled in parallel with the first resistor RCS, the light emitting element 15, the first switching element 11, and the inductor 14 between the second switching element 12 and the first power supply node NVI, and a second resistor RIS coupled between the second switching element 12 and the second power supply node NGN. The first switching element 11 and the second switching element 12 are, for example, N-type transistors.

The light emitting element 15 is driven by a current ILD, and emits light with a brightness according to a current value of the current ILD. The light emitting element 15 is configured with a plurality of laser diodes coupled in series. However, the light emitting element 15 may also be configured with one laser diode or, alternatively may be an LED (Light Emitting Diode).

Note that the first power supply node NVI is a node to which a first power supply VIN is input, and the second power supply node NGN is a node to which a second power supply is input. The voltage of the first power supply node NVI is higher than the voltage of the second power supply node NGN. The second power supply node NGN is, for example, a ground.

The second switching element 12 performs switching regulation control of the current that flows through the inductor 14. The first switching element 11 controls whether or not the current that flows through the inductor 14 flows through the light emitting element 15. A mode in which the first switching element 11 is always on and the light emission amount of the light emitting element 15 is controlled by the switching regulation control of the second switching element 12 is called a current light control mode. A mode in which the light emission amount of the light emitting element 15 is controlled by the on duty of the first switching element 11 due to the first switching element 11 being turned on/off is referred to as a PWM light control mode.

As shown in FIG. 1, the light emission control device 100 is a device that controls the first switching element 11 of the light source circuit 10. The light emission control device 100 includes a first detection circuit 131 and a second detection circuit 132. The first detection circuit 131 detects a first potential difference that is a potential difference between both ends of the first resistor RCS. The second detection circuit 132 compares the first potential difference that is a potential difference between both ends of the first resistor RCS with a determination value.

The light emission control device 100 includes a logic determination circuit 134 that determines whether or not the first switching element 11 is short-circuited. Further, the light emission control device 100 includes a light emission control circuit 101 that outputs a first control signal DRV that controls on/off of the first switching element 11. The second detection circuit 132 and the logic determination circuit 134 are electrically coupled. The second detection circuit 132 and the logic determination circuit 134 are circuits that detect short-circuit of the first switching element 11. The first detection circuit 131 and the logic determination circuit 134 are electrically coupled to the light emission control circuit 101.

The light emission control device 100 includes a PWM terminal TDCS, a light control voltage input terminal TACS, a terminal TEOUT, a terminal TDRV, a terminal TGTB, a terminal TIS, a terminal TCSP, and a terminal TCSN. Note that the first detection circuit 131 may be called an over-current detection circuit or a short-circuit detection circuit.

A processing device 300 is electrically coupled to the PWM terminal TDCS, and a PWM signal DCS used for control of light control in the PWM light control mode is input from the processing device 300. A light control voltage ACS used for control of light control in the current light control mode is input from the processing device 300 to the light control voltage input terminal TACS. The processing device 300 is a host device of the light emission control device 100 and includes a processor such as an MPU (Microprocessor) or a CPU (Central Processing Unit).

The terminal TEOUT is a terminal that outputs an error signal when the second switching element 12 is short-circuited. The terminal TDRV is a terminal that outputs the first control signal DRV, which drives the first switching element 11. The terminal TGTB is a terminal that outputs a second control signal GTB, which drives the second switching element 12.

The terminal TIS is a terminal that inputs a voltage of the second resistor RIS on the side of the second switching element 12. The terminal TCSP and the terminal TCSN are terminals that input a voltage at both ends of the first resistor RCS.

The voltage at both ends of the first resistor RCS is input to a current detection circuit 123. The current detection circuit 123 outputs a detection voltage DTQ obtained by amplifying the voltage at both ends of the first resistor RCS to the first detection circuit 131 and the second detection circuit 132.

The first detection circuit 131 compares the detection voltage DTQ with a first predetermined value, and outputs a first detection signal DETC that is the result of the comparison. The first predetermined value is a parameter that controls the value of the current that flows through the light emitting element 15. The first detection circuit 131 outputs a low level first detection signal DETC to the light emission control circuit 101 when the detection voltage DTQ is less than the first predetermined value, and outputs a high level first detection signal DETC to the light emission control circuit 101 when the detection voltage DTQ is greater than the first predetermined value.

The first predetermined value is set to a voltage value higher than the detection voltage DTQ during normal operation. For example, assume that a maximum current of 3 A flows when the current value that flows through the light emitting element 15 is normal. In this case, if the first resistor RCS is 50 mΩ, the potential difference between both ends is 150 mV. The potential difference of 150 mV is input from the terminals TCSN and TCSP of the light emission control device 100 to the current detection circuit 123, and the current detection circuit 123 amplifies the potential difference of 150 mV to, for example, 3V. This amplified voltage becomes the detection voltage DTQ. That is, in this case, the first predetermined value is set to a voltage value higher than the detection voltage DTQ in the normal operation, and is at least 3V.

The second detection circuit 132 compares the detection voltage DTQ with a determination value, and outputs a second detection signal DETD that is the result of the comparison. The second detection circuit 132 outputs a low level second detection signal DETD to the logic determination circuit 134 when the detection voltage DTQ is less than the determination value, and outputs a high level second detection signal DETD to the logic determination circuit 134 when the detection voltage DTQ is greater than the determination value.

The determination value is set within a range of voltage values corresponding to a current that flows in a range from 1/10 or more to 9/10 or less with respect to a lower limit value of the current amount that flows through the light emitting element 15 during normal operation.

For example, assume that a minimum current of 1 A flows when the current value that flows through the light emitting element 15 is normal. In this case, if the first resistor RCS is 50 mΩ, the potential difference between both ends is 50 mV. The potential difference of 50 mV is input from the terminals TCSN and TCSP of the light emission control device 100, and the current detection circuit 123 amplifies the potential difference of 50 mV to, for example, 1V. This amplified voltage becomes the detection voltage DTQ. That is, in this case, the determination value is set within a range of voltage values corresponding to a current that flows in a range from 1/10 or more to 9/10 or less with respect to a lower limit value of the current amount that flows through the light emitting element 15 during normal operation. In the present embodiment, for example, the lower limit of the amount of current that flows through the light emitting element 15 during normal operation is 1 V, and the determination value is set in a range from 0.1 V or more to 0.9 V or less.

The light emission control circuit 101 performs light control of the light emission amount of the light emitting element 15 by controlling on/off of the first switching element 11 and the second switching element 12 based on the PWM signal DCS and the light control voltage ACS. The light emission control circuit 101 includes a first drive circuit 110, a second drive circuit 120, an oscillation circuit 140, and an operation control circuit 133.

The operation control circuit 133 is electrically coupled to the first drive circuit 110. When the first switching element 11 is turned on, the operation control circuit 133 outputs a high level first drive circuit control signal DRVB to the first drive circuit 110. When the first switching element 11 is turned off, the operation control circuit 133 outputs a low level first drive circuit control signal DRVB to the first drive circuit 110. Note that the first control signal DRV when the first switching element 11 is turned on is set to an active state. The first control signal DRV when the first switching element 11 is turned off is set to an inactive state.

The first drive circuit 110 outputs the first control signal DRV based on the first drive circuit control signal DRVB. The first control signal DRV is a signal that controls the first switching element 11 to be turned on or off. The first control signal DRV is output from the terminal TDRV and is input to a gate of the first switching element 11. The first drive circuit 110 outputs a first control signal DRV that turns on the first switching element 11 when the PWM signal DCS is active, and outputs a first control signal DRV that turns off the first switching element 11 when the PWM signal DCS is inactive. The first drive circuit 110 includes, for example, a buffer circuit or the like that buffers the first drive circuit control signal DRVB.

When a state in which the second detection signal DETD is high level and the first drive circuit control signal DRVB is low level has continued for a predetermined time, the logic determination circuit 134 outputs a high level logic determination circuit output signal ERR. The logic determination circuit output signal ERR is normally low level. The high level logic determination circuit output signal ERR is an error signal. The error signal is output from the terminal TEOUT. The detection time is defined as the determination time, in which a state in which the second detection signal DETD is high level and the first drive circuit control signal DRVB is low level has continued for the predetermined time.

In the light emission control device 100, the light emission control circuit 101 sets the first control signal DRV to a first drive stoppage state that inactivates the first control signal DRV, and when the second detection circuit 132 has detected that the first potential difference is larger than the determination value, the logic determination circuit 134 outputs an error signal from the terminal TEOUT.

The oscillation circuit 140 generates a clock signal CLK. For example, the oscillation circuit 140 is a CR oscillation circuit, a ring oscillator, a multivibrator, or the like.

The second drive circuit 120 outputs the second control signal GTB based on the light control voltage ACS, the PWM signal DCS, and the clock signal CLK. The second control signal GTB is output from the terminal TGTB and is input to the gate of the second switching element 12. The second control signal GTB controls on/off of the second switching element 12 during a period when the PWM signal DCS is active. Specifically, a voltage CSP at one end of the first resistor RCS is input to the terminal TCSP, a voltage CSN at the other end of the first resistor RCS is input to the terminal TCSN, and the voltage IS at one end of the second resistor RIS is input to the terminal TIS. The second drive circuit 120 performs switching regulation control of the current ILD that flows through the light emitting element 15 based on the voltage CSP, the voltage CSN, the voltage IS, and the light control voltage ACS, so that the current ILD becomes a current corresponding to the light control voltage ACS.

The second drive circuit 120 of the light emission control circuit 101 outputs a second control signal GTB that controls on/off of the second switching element 12. The second drive circuit 120 sets the second control signal GTB to a second drive stoppage state that inactivates the second control signal GTB. Further, the first control signal DRV is set to a first drive stoppage state that inactivates the first control signal DRV. At this time, the logic determination circuit 134 outputs an error signal from the terminal TEOUT before the first potential difference becomes smaller than the determination value.

When the logic determination circuit 134 outputs an error signal from the terminal TEOUT, the light emission control circuit 101 fixes the second control signal GTB to an inactive state.

The second drive circuit 120 includes a control signal output circuit 121, a slope compensation circuit 122, a current detection circuit 123, an error amplifier circuit 124, a switch circuit 125, and a comparator 126. Hereinafter, the operation of each part of the second drive circuit 120 and each light control mode of the first drive circuit 110 will be described with reference to the waveform charts of FIGS. 3 and 4. Note that hereinafter, active corresponds to a high level signal, and inactive corresponds to a low level signal. Also, the first detection signal DETC corresponds to an inactive state.

Figure 3:
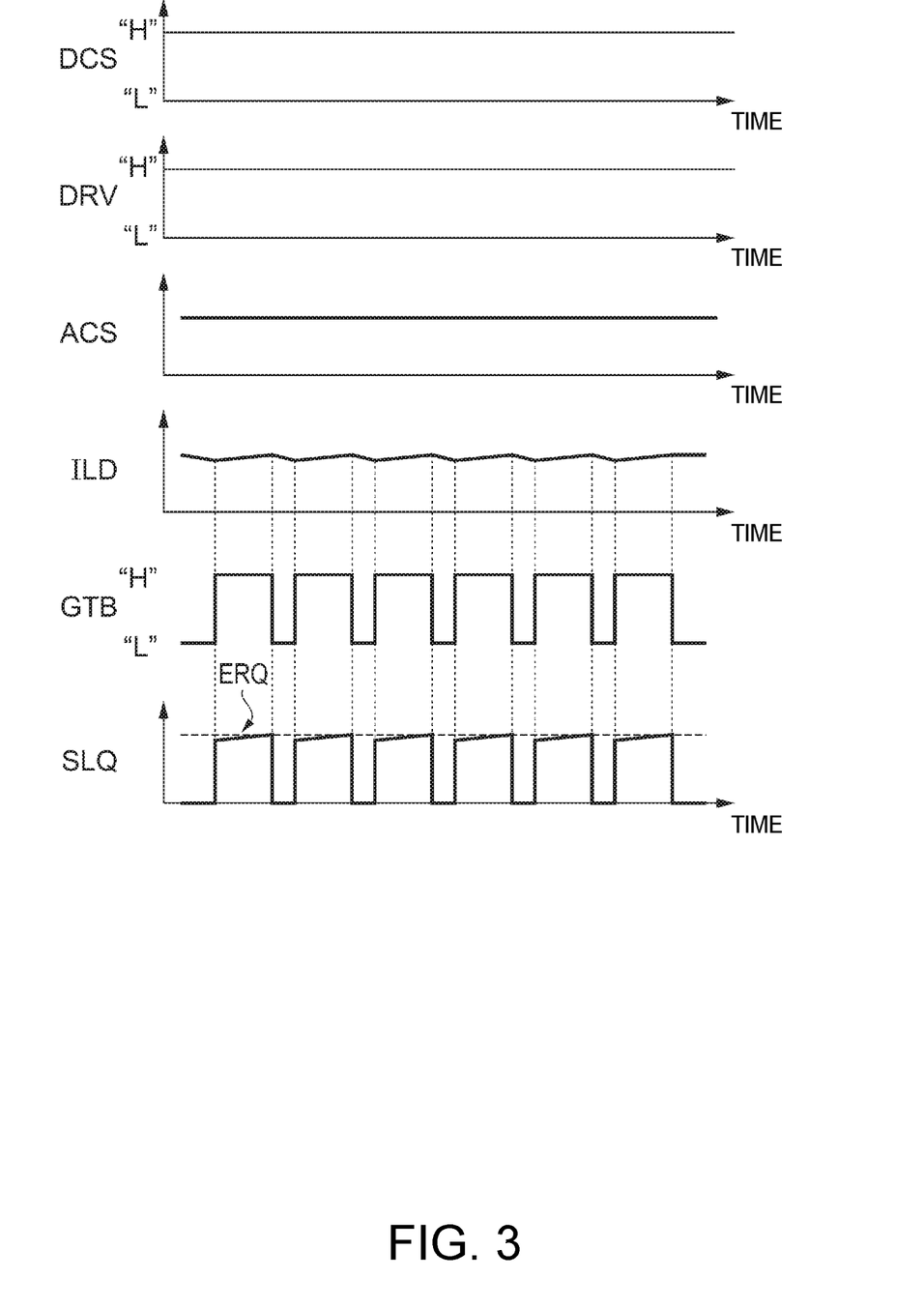
FIG. 3 shows a waveform chart in a current light control mode.

FIG. 3 shows a waveform chart in a current light control mode. As shown in FIGS. 1, 2 and 3, in the current light control mode, the PWM signal DCS is high level. High level is the "H" level in the drawings. The first drive circuit 110 outputs the high level first control signal DRV, so that the first switching element 11 is always turned on. Note that in the PWM light control mode, the PWM signal DCS is a rectangular wave having a high width duty of less than 100%. High width indicates a time interval during which the high level of the rectangular wave continues. In the current light control mode, the processing device 300 always sets the PWM signal DCS to high level. In other words, the processing device 300 sets the PWM signal DCS to a high width PWM signal having a duty of 100%.

The current detection circuit 123 outputs a detection voltage DTQ by multiplying a potential difference between both ends of the first resistor RCS by a given gain. Note that the potential difference between both ends of the first resistor RCS is calculated as (voltage CSP−voltage CSN=resistance value of the first resistor RCS×current value of current ILD). The error amplifier circuit 124 amplifies the difference between the detection voltage DTQ and the light control voltage ACS. The error amplifier circuit 124 outputs the amplified voltage to the switch circuit 125. The light control voltage ACS is set to a predetermined voltage value by the processing device 300. The switch circuit 125 turns on when the PWM signal DCS is high level, and turns off when the PWM signal DCS is low level. In the current light control mode, the switch circuit 125 is always on. The switch circuit 125 outputs a voltage ERQ to the comparator 126.

The slope compensation circuit 122 increases the slope of the voltage IS over time to suppress the sub-harmonic oscillation of the drive current that flows through the laser diode, and outputs a voltage SLQ after the slope increase to the comparator 126. The comparator 126 compares the voltage SLQ output from the slope compensation circuit 122 with the voltage ERQ output from the error amplifier circuit 124. The comparator 126 outputs a low level signal CPQ to the control signal output circuit 121 when the voltage SLQ is less than the voltage ERQ, and outputs a high level signal CPQ to the control signal output circuit 121 when the voltage SLQ is greater than the voltage ERQ.

The control signal output circuit 121 causes the second control signal GTB to transition from low level to high level at the edge of the clock signal CLK. Since the second switching element 12 is on when the second control signal GTB is at high level, a current flows from the inductor 14 to the second power supply node NGN through the second switching element 12 and the second resistor RIS. Since the current that flows through the inductor 14 increases, the voltage IS increases, and the voltage SLQ output from the slope compensation circuit 122 increases. Since the current that flows through the inductor 14 flows through the first switching element 11 to the light emitting element 15, the current ILD that flows through the light emitting element 15 also increases.

When the voltage SLQ is greater than the voltage ERQ, the signal CPQ output from the comparator 126 transitions from low level to high level. At this time, the control signal output circuit 121 causes the second control signal GTB to transition from high level to low level. When the second control signal GTB is at low level, the second switching element 12 is off, so that a current flows from the inductor 14 to the first power supply node NVI through the rectifier diode DA. The current that flows through the inductor 14 drops, so the current ILD that flows through the light emitting element 15 also decreases.

When the detection voltage DTQ, which is the result of detecting the current ILD, is different from the light control voltage ACS, the voltage ERQ output from the error amplifier circuit 124 changes, so that the duty of the second control signal GTB changes. Thereby, feedback of the current ILD is controlled so that the detection voltage DTQ matches the light control voltage ACS. By such feedback control, the current ILD is kept substantially constant. The control that keeps the current ILD substantially constant is called a switching regulation control. The current ILD is kept at the current value corresponding to the light control voltage ACS. When the processing device 300 has changed the light control voltage ACS, the current ILD changes accordingly. That is, in the current light control mode, light control of the light emission amount of the light emitting element 15 is performed according to the light control voltage ACS.

The current light control mode is used in a range from the maximum value of the current ILD to a predetermined value. That is, when the light emitting element 15 emits light with high luminance, the current light control mode is used. On the other hand, when the current ILD is less than the predetermined value, that is, when the light emitting element 15 emits light with low luminance, the PWM light control mode is used.

Figure 4:
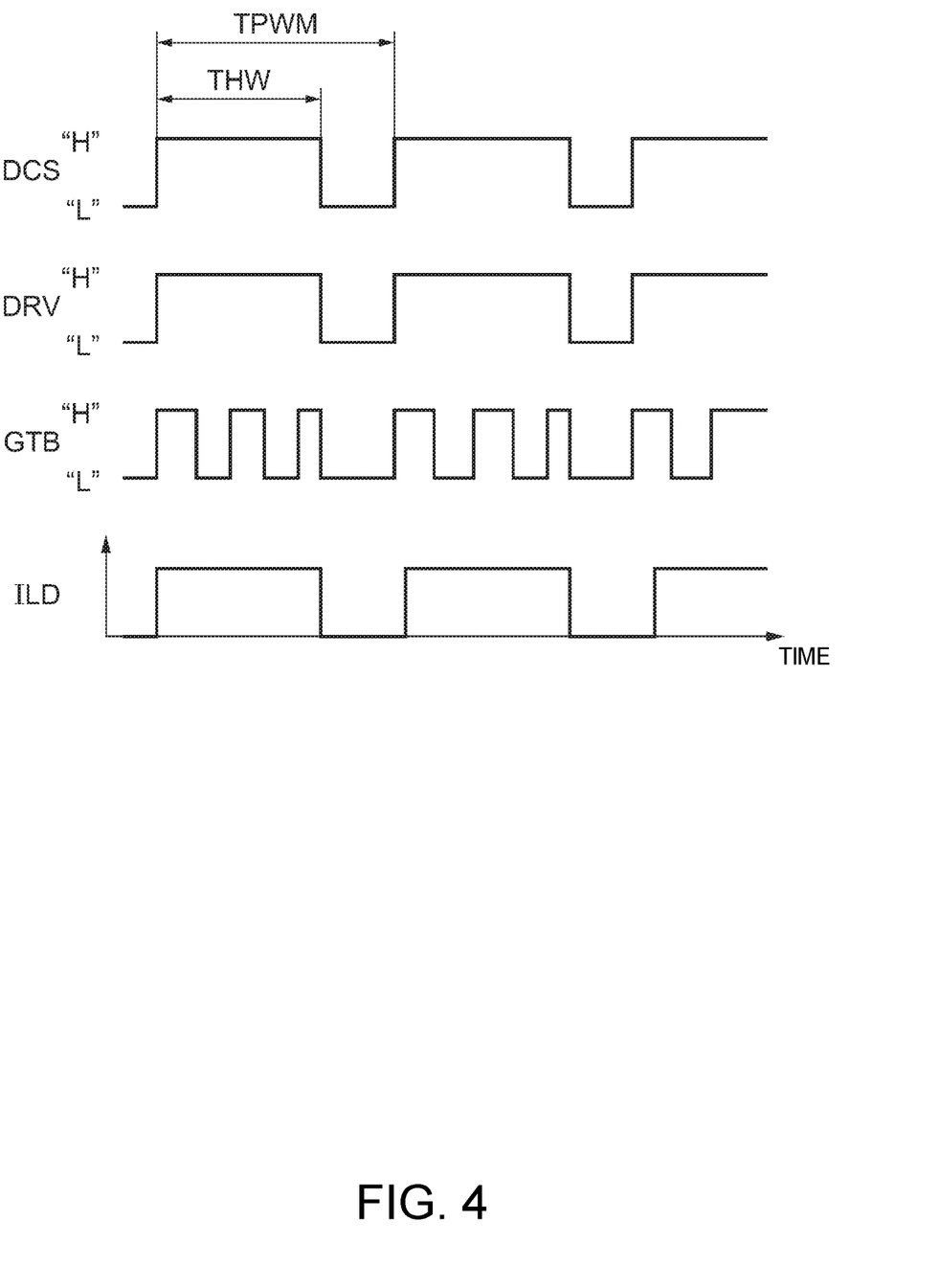
FIG. 4 shows a waveform chart in a PWM light control mode.

FIG. 4 shows a waveform chart in the PWM light control mode. As shown in FIGS. 1, 2 and 4, in the PWM light control mode, the processing device 300 sets the PWM signal DCS to a rectangular wave. The period of the PWM signal DCS is referred to as a period TPWM, and the period during which the PWM signal DCS is high level is referred to as a period THW. The duty of the PWM signal DCS is calculated as (period THW/period TPWM)×100%. Note that the frequency of the second control signal GTB is set higher than the frequency of the PWM signal DCS.

When the PWM signal DCS is at high level, the first drive circuit 110 outputs a high-level first control signal DRV to turn on the first switching element 11. At this time, the second drive circuit 120 switches the second control signal GTB to perform switching regulation control. As a result, the current ILD corresponding to the light control voltage ACS flows through the light emitting element 15. When the PWM signal DCS is at low level, the first drive circuit 110 outputs a low level first control signal DRV to turn off the first switching element 11. The second drive circuit 120 sets the second control signal GTB to low level. At this time, no current flows through the light emitting element 15.

Since the time average of the current ILD that flows through the light emitting element 15 is determined by the duty of the PWM signal DCS, the light emission amount is also determined by the duty of the PWM signal DCS. As described above, in the PWM light control mode, the light control is controlled by the duty of the rectangular wave PWM signal DCS. As for the current value when the current ILD is flowing through the light emitting element 15, a current value is secured that is higher than the average current value over time. In order to cause the laser diode to emit light, it is necessary to supply a current ILD of at least a threshold value to the laser diode. By performing the above-described PWM control, it is possible to cause the laser diode to emit light by causing a current ILD of at least the threshold value to flow, and to perform light control as an average over time.

2. Method of Detecting Overcurrent

Figure 5:
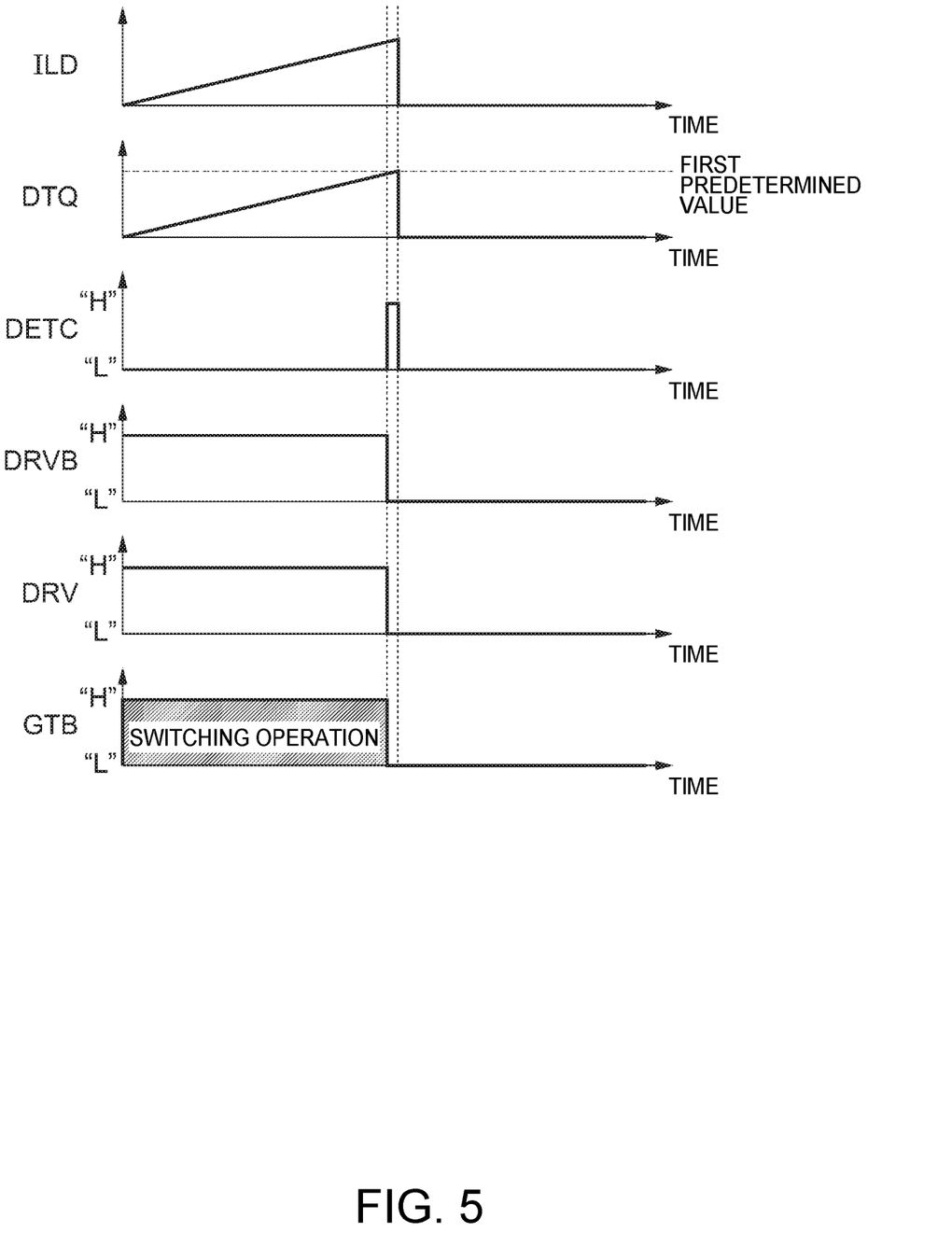
FIG. 5 shows a waveform chart of signals when detecting overcurrent.

Next is described a method of detecting that the current amount of the current ILD that flows through the light emitting element 15 has become excessive and stopping the first switching element 11. FIG. 5 is a waveform chart of signals when detecting overcurrent. In FIGS. 1, 2 and 5, when the current ILD that flows through the light emitting element 15 becomes larger than the current ILD that flows in the normal state, the current ILD increases. A value obtained by converting the amount of current that flows through the first resistor RCS to a voltage is input to the current detection circuit 123, and the detection voltage DTQ increases. Then, the current detection circuit 123 outputs a detection voltage DTQ higher than the normal voltage. This detection voltage DTQ is input to the first detection circuit 131. While the detection voltage DTQ exceeds the first predetermined value, the first detection signal DETC from the first detection circuit is high level. The first detection signal DETC is output to the operation control circuit 133.

When the first detection signal DETC becomes high level even once, the operation control circuit 133 continues to output the first drive circuit control signal DRVB at low level. Since this signal is input to the first drive circuit, the first drive circuit 110 outputs the first control signal DRV at low level. Since the first control signal DRV is low level, the first switching element 11 stops.

The first detection signal DETC is also input to the control signal output circuit 121. When the first detection signal DETC becomes high level even once, the control signal output circuit 121 continues to output the second control signal GTB at low level. Since the second control signal GTB is low level, the second switching element 12 stops.

Thus, when the amount of the current ILD that flows through the light emitting element 15 becomes excessive, the light emission control circuit 101 stops the first switching element 11 and the second switching element 12.

3. Method for Detecting Short-Circuit of First Switching Element

Next is described a method of detecting that the first switching element 11 for PWM light control is short-circuited.

Figure 6:
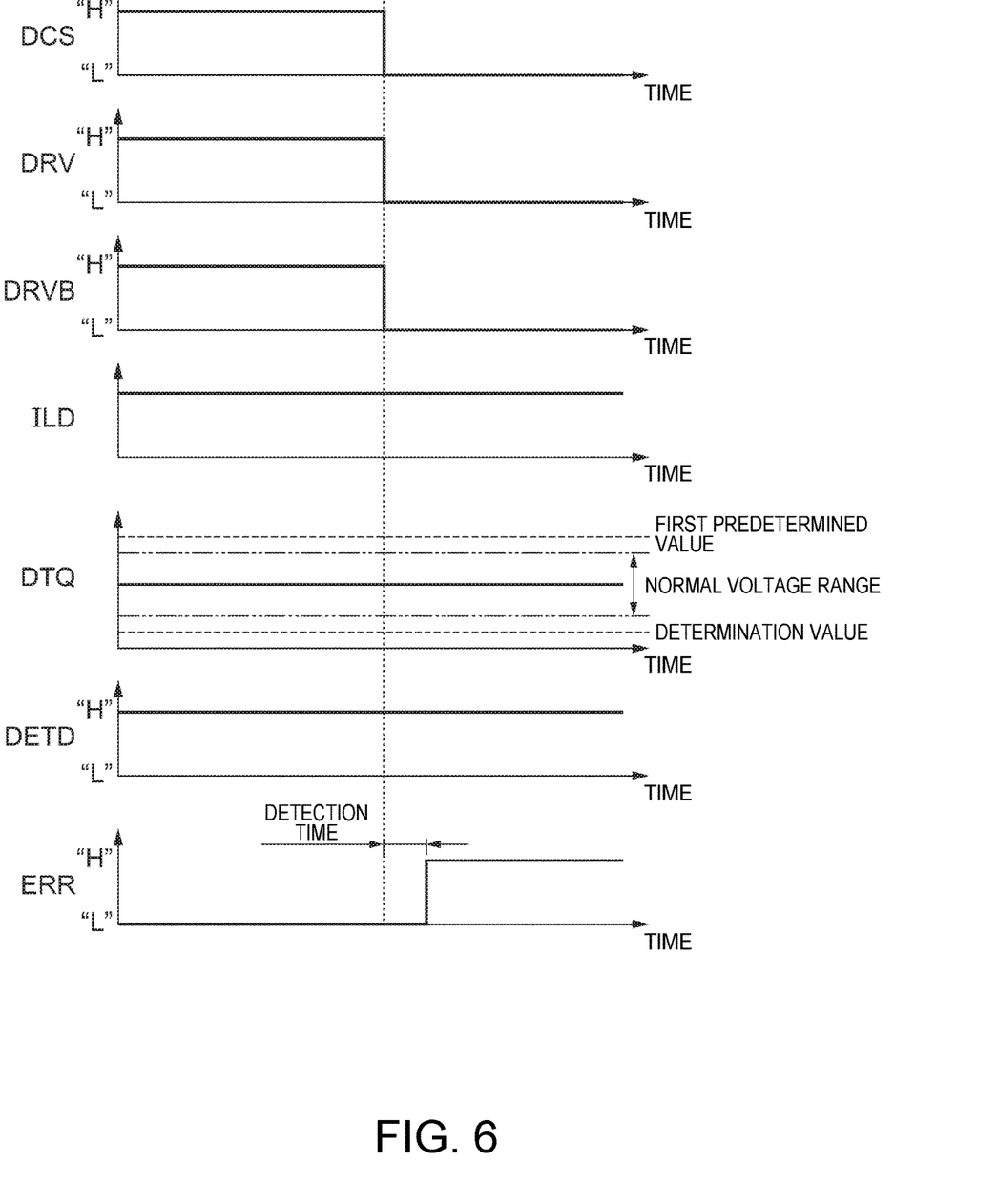
FIG. 6 shows a waveform chart of signals when detecting a short-circuit of a first switching element.

FIG. 6 shows a waveform chart of signals when detecting a short-circuit of a first switching element. A case where the first switching element 11 is, for example, an N-type transistor will be described. When it is desired to detect whether the drain and the gate or the drain and the source of the first switching element 11 are short-circuited, the processing device 300 changes the PWM signal DCS input from the terminal TDCS of the light emission control device 100 from high level to low level.

The operation control circuit 133 inputs a low level PWM signal DCS and outputs a low level first drive circuit control signal DRVB to the first drive circuit 110. The first drive circuit 110 inputs a low level first drive circuit control signal DRVB and outputs a low level first control signal DRV to the first switching element 11 from the terminal TDRV. At this time, the first drive signal DRV is output to the first switching element 11 at low level. When the drain and the gate or the drain and the source of the first switching element 11 are short-circuited, the first switching element 11 is always on or half on even if the first drive signal DRV is at low level.

When the first switching element 11 is always on, the first resistor RCS of the light source circuit 10 has a current value about the same as when the first switching element 11 is normally on, even if the first switching element 11 is off. The current detection circuit 123 inputs a value obtained by converting the current amount of the current ILD that flows through the first resistor RCS to a voltage from the terminals TCSN and TCSP of the light emission control device 100. The voltage value of this voltage is amplified by the current detection circuit 123 to become the detection voltage DTQ. The detection voltage DTQ in the drawings indicates a state where the first switching element 11 is short-circuited. At this time, the detection voltage DTQ is in the normal voltage range. Thereafter, the amplified detection voltage DTQ is supplied to the second detection circuit 132. The second detection circuit 132 compares the detection voltage DTQ with a determination value set to $9/10$ or less and $1/10$ or more of the lower limit value of the normal detection voltage DTQ. When the detection voltage DTQ is higher than the determination value, the second detection circuit 132 outputs the second detection signal DETD at high level.

The second detection signal DETD and the first drive circuit control signal DRVB are input to the logic determination circuit 134. When a state where the second detection signal DETD is at high level and the first drive circuit control signal DRVB is at low level has continued for at least a predetermined detection time, the logic determination circuit 134 outputs a high level logic determination circuit output signal ERR to the terminal TEOUT.

When the second detection signal DETD is high level and the first drive circuit control signal DRVB is low level, the logic determination circuit 134 does not immediately output the logic determination circuit output signal ERR, but in order to prevent erroneous detection, outputs the logic determination circuit output signal ERR after a predetermined time has elapsed. The logic determination circuit output signal ERR is output from the terminal TEOUT of the light emission control device 100 to the outside as an error signal. Output of this error signal indicates that the short circuit of the first switching element 11 has been detected.

The light emission control device of the present embodiment described above controls the first switching element 11 and the second switching element 12 of the light source circuit 10. The light source circuit 10 includes the first resistor RCS, the light emitting element 15 and the first switching element 11 provided in series between the first power supply node NVI and the second power supply node NGN. In addition, the light source circuit 10 includes the inductor 14, the second switching element 12, and the second resistor RIS provided in series between the first switching element 11 and the second power supply node NGN. The first detection circuit 131 detects whether or not the first potential difference, which is the potential difference between both ends of the first resistor RCS, is greater than the first predetermined value. The second detection circuit 132 detects whether or not the first potential difference is larger than the determination value. The logic determination circuit 134 outputs a high level signal when the state in which the output signal of the second detection circuit 132 is high level and the output signal of the operation control circuit 133 is low level continues for at least the predetermined detection time. When a high level signal has been output from the logic determination circuit 134, the light emission control device 100 outputs an error signal for notifying that the first switching element 11 is short-circuited to the outside.

As described above, the present embodiment has the following effects.

(1) In the present embodiment, since the current flows from the first power supply node NVI toward the second power supply node NGN, the first switching element 11 is provided on the low side of the light emitting element 15. When the first control signal DRV is set to the first drive stoppage state that inactivates the first control signal DRV, the first switching element 11 is turned off when the first switching element 11 operates normally, and the current path from the light emitting element 15 to the low side is cut off, so no current flows through the light emitting element 15.

However, when the first switching element 11 operates abnormally, for example, when the drain and the gate or the drain and the source of the first switching element 11 are short-circuited, even if the first switching element 11 is in the first drive stoppage state, current flows from light emitting element 15 to second power supply node NGN. At this time, the detection voltage DTQ corresponding to the first potential difference becomes larger than the determination value.

In the first drive stoppage state, when the detection voltage DTQ corresponding to the first potential difference, which is the potential difference between both ends of the first resistor RCS, is detected to be larger than the determination value, the logic determination circuit 134 outputs an error signal from the terminal TEOUT. From the error signal, it is possible to detect that the first switching element 11 is short-circuited, and that correct on/off operation control is not possible.

In JP-A-2018-106862, only general overcurrent detection is performed in order to avoid abnormalities or failures due to overcurrent. That is, overcurrent detection is performed on the current that flows through the light emitting element 15, and the detection result is used to deal with the overcurrent of the light emitting element 15. Therefore, even if the first switching element 11 serving as the PWM light control switching element is short-circuited, the overcurrent does not flow through the light emitting element 15, and the short-circuit of the first switching element 11 cannot be detected. In the light emission control device 100 of the present embodiment, a short circuit of the first switching element can be detected.

(2) In the present embodiment, when the first switching element 11 is in the first drive stoppage state due to detecting the first potential difference with the first resistor RCS, an error signal is output from the terminal TEOUT of the light emission control device 100. The first resistor RCS used for monitoring the amount of current that flows through the light emitting element 15 is also used for overcurrent detection when the amount of current that flows through the light emitting element 15 is excessive.

Therefore, when the determination value is set to a voltage value higher than the detection voltage range during normal operation, a state where on/off operation cannot be controlled due to the short-circuit of the first switching element 11 cannot be distinguished from a state of overcurrent detection.

If the determination value is set to $9/10$ or more of the lower limit value during normal operation, it is possible that non-detection will result when a setting is adopted to operate at the lower limit value during normal operation. Also, if the determination value is set to less than $1/10$ of the lower limit value during normal operation, it is possible that accurate detection cannot be performed due to the very small voltage value, resulting in erroneous detection.

However, since the determination value is set within a range of voltage values corresponding to a current that flows in a range from $1/10$ or more to $9/10$ or less with respect to the lower limit value of the current amount that flows through the light emitting element 15 during normal operation, it is possible to distinguish between overcurrent detection, non-detection, erroneous detection, and the like.

(3) In the present embodiment, the light emission control circuit 101 monitors the potential difference between both ends of the first resistor RCS, and adjusts the on time of the second switching element 12. Also, the second switching element 12 changes the voltage value applied to both ends of the inductor 14, and the smoothing capacity CA stabilizes the current generated by the inductor 14. Also, the light emission control circuit 101 controls the current amount that flows through the light emitting element 15 such that the current amount is constant.

In a state where the first switching element 11 is short-circuited and correct on/off operation control cannot be performed, the light emission control circuit 101 inactivates both the first control signal DRV and the second control signal GTB. As a result, the first switching element 11 and the second switching element 12 enter the first drive stoppage state and the second drive stoppage state, respectively.

At this time, since energy is stored in the inductor 14, the current passes through the rectifier diode DA, and the current value stabilized by the smoothing capacitor CA flows through the light emitting element 15. When the second drive stoppage state continues, a state where no potential difference occurs between both ends of the inductor 14 is set. Also, the energy stored in the inductor 14 decreases, and the amount of current that flows through the light emitting element 15 decreases over time. Therefore, the detection time in which the first potential difference is at least the determination value is shortened.

However, by outputting an error signal during the detection time, the first switching element 11 is short-circuited even with a driving method in which not only the first switching element 11 but also the second switching element 12 is set to an inactive state. Thus, it is possible to detect that correct on/off operation control has not been performed.

(4) In the present embodiment, the light emission control device 100 outputs an error signal when detecting that the first switching element 11 is short-circuited and correct on/off operation control has not been performed. At this time, the first switching element 11 is set to a half on state because the first switching element 11 is short-circuited, and the resistance value of the first switching element 11 increases.

Therefore, there is a concern that heat is generated by the current that flows through the first switching element 11 until an error signal is output from the light emission control device 100 to the outside and a command is returned from the outside. However, by fixing the second control signal GTB to an inactive state when the light emission control device 100 outputs the error signal, the heat generation of the first switching element 11 can be suppressed.

(5) In the present embodiment, the light emission control device 100 has a function of outputting an error signal indicating that the first switching element 11 is short-circuited. Therefore, in the manufacturing inspection process of the light source device 200, a short circuit of the first switching element 11 on a printed circuit board can be easily found.

4. Projection-type Video Display Device

Figure 7:
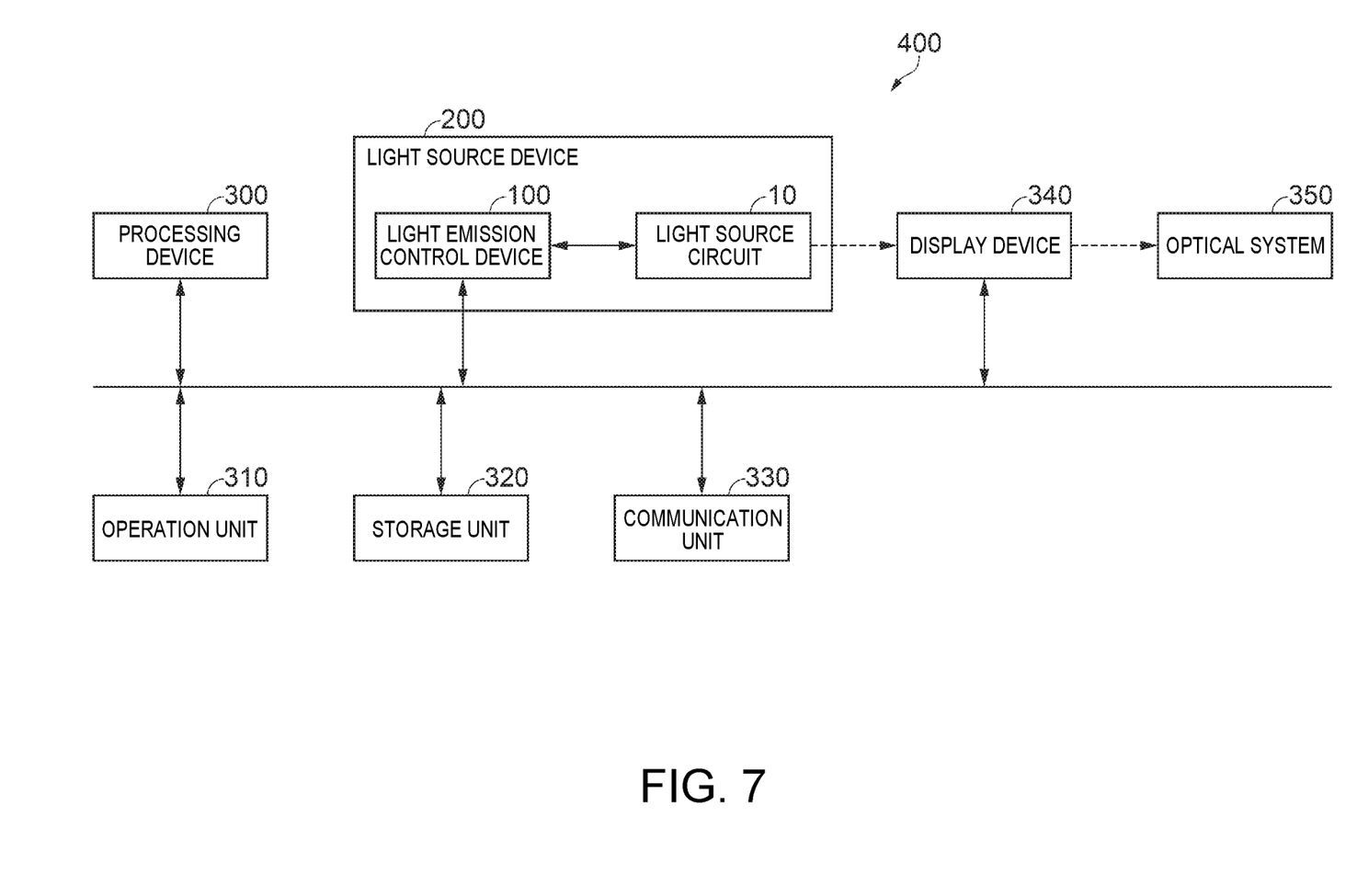
FIG. 7 is an electric block diagram showing a configuration of a projection-type video display device.

FIG. 7 is an electric block diagram showing a configuration of a projection-type video display device 400 including a light source device 200. As shown in FIG. 7, the projection-type video display apparatus 400 is an apparatus that projects a video on a screen, and is also called a projector. The projection-type video display apparatus 400 includes a light source device 200, a processing device 300 that controls the light source device 200, an operation unit 310, a storage unit 320, a communication unit 330, a display device 340, and an optical system 350. The light source device 200 includes the light emission control device 100 and the light source circuit 10.

The communication unit 330 communicates with the processing device 300 such as a PC (Personal Computer). The processing device 300 is a device that processes information. The communication unit 330 is a video interface of various types, such as an interface according to a VGA (Video Graphics Array) standard, a DVI (Digital Visual Interface) standard, or an HDMI (registered trademark) (High-Definition Multimedia Interface) standard. Alternatively, the communication unit 330 may be a communication interface according to a USB standard, or a network interface such as a LAN (Local Area Network). The storage unit 320 stores image data input from the communication unit 330. Further, the storage unit 320 may function as a working memory of the processing device 300. The storage unit 320 is a storage device of various types, such as a semiconductor memory or a hard disk drive. The operation unit 310 is a user interface for a user to operate the projection-type video display apparatus 400. For example, the operation unit 310 is a button or a touch panel, a pointing device, a character input device, or the like.

The processing device 300 is a processor such as a CPU or an MPU. The processing device 300 transmits the image data stored in the storage unit 320 to the display device 340. Further, the processing device 300 performs control of the light control by outputting a PWM signal and a light control voltage to the light emission control device 100. The display device 340 includes a liquid crystal display panel and a display driver that displays an image on the liquid crystal display panel based on the image data. Light from the light source circuit 10 is incident on the liquid crystal panel, and light transmitted through the liquid crystal panel is projected on a screen by the optical system 350. In FIG. 7, the path of light is indicated by dotted arrows.

As described above, the light emission control device 100 has a function of outputting an error signal indicating that the first switching element 11 is short-circuited. In the present embodiment, when the user uses the projection-type video display device 400, even if the first switching element 11 is short-circuited while using the first switching element 11, the light emission control device 100 outputs an error signal. The processing device 300 can receive the error signal and transmit the error information to the user.

Note that the present disclosure is not limited to the above-described embodiments, and various changes and improvements can be added to the above-described embodiments. Modified examples will be described below.

Modified Example 1

In the present embodiment, the first resistor RCS, the light emitting element 15, and the first switching element 11 are arranged in this order between the first power supply node NVI and the inductor 14, but a configuration may also be adopted in which the first resistor RCS, the light emitting element 15, and the first switching element 11 are rearranged in any manner. An appropriate circuit arrangement can be adopted.

Modified Example 2

In the present embodiment, the first switching element 11 is, for example, an N-type transistor, but the first switching element 11 may also be a P-type transistor. An easily obtainable element can be used.

Modified Example 3

In the present embodiment, the determination value is set within a range of voltage values corresponding to a current that flows in a range from $1/10$ or more to $9/10$ or less with respect to the lower limit value of the current amount that flows through the light emitting element 15. The reason for setting the value to $9/10$ or less is that if the determination value is set to $9/10$ or more of the lower limit value during normal operation, it is possible that non-detection will result when a setting is adopted to operate at the lower limit value during normal operation. Also, the reason for setting the value to $1/10$ or more is that if the determination value is set to less than $1/10$ of the lower limit value during normal operation, it is possible that accurate detection cannot be performed due to the very small voltage value, resulting in erroneous detection. Therefore, it is sufficient that the determination value is set to more than or equal to a voltage value that does not cause erroneous detection and less than or equal to a voltage value that results in non-detection, and the determination value may exceed the range of $1/10$ or more to $9/10$ or less.

Content derived from the embodiments will be described below.

One aspect of the disclosure relates to a light emission control device that controls a first switching element of a light source circuit including a first resistor, a light emitting element, and the first switching element coupled in series between a first power supply node and a second power supply node set to a lower potential than the first power supply node, the light emission control device including: a second detection circuit that compares a first potential difference that is a potential difference between both ends of the first resistor with a determination value; a light emission control circuit that outputs a first control signal that controls on/off of the first switching element; and a logic determination circuit that determines whether or not the first switching element is short-circuited, where the light emission control circuit sets the first control signal to a first drive stoppage state that inactivates the first control signal, and when the second detection circuit has detected that the first potential difference is larger than the determination value, the logic determination circuit outputs an error signal.

In this light emission control device, a first resistor, a light emitting element, and a first switching element are provided in series between a first power supply node and a second power supply node. Since the current flows from the first power supply node toward the second power supply node, the first switching element is provided on a low side of the light emitting element.

When the first control signal is set to the first drive stoppage state that inactivates the first control signal, the first switching element is turned off when the first switching element operates normally, and the current path from the light emitting element to the low side is cut off, so no current flows through the light emitting element.

However, when the first switching element operates abnormally, for example, when the drain and the gate or the drain and the source of the first switching element are short-circuited, even if the first switching element is in the first drive stoppage state, current flows from light emitting element to second power supply node.

At this time, the first potential difference becomes larger than the determination value. In the first drive stoppage state, when it is detected that the first potential difference, which is the potential difference between both ends of the first resistor, is larger than the determination value, the logic determination circuit outputs an error signal.

From the error signal, it is possible to confirm that the first switching element is short-circuited, and that correct on/off operation control has not been performed. Therefore, it is possible to detect a problem that the first switching element serving as the PWM light control switching element is short-circuited.

In the above light emission control device, a configuration may be adopted in which the determination value is set within a range of voltage values corresponding to a current that flows in a range from $1/10$ or more to $9/10$ or less with respect to a lower limit value of a current amount that flows through the light emitting element during normal operation.

In this light emission control device, when the first switching element is in the first drive stoppage state due to detecting the first potential difference with the first resistor, an error signal is output from the light emission control device. The first resistor used for monitoring the amount of current that flows through the light emitting element is also used for detecting overcurrent when the amount of current that flows through the light emitting element is excessive.

Therefore, when the determination value is set to a voltage value higher than the detection voltage range during normal operation, it is not possible to distinguish between a state in which on/off operation cannot be controlled due to a short circuit of the first switching element, and a state of overcurrent detection.

Also, if the determination value is set to $9/10$ or more of the lower limit value during normal operation, it is possible that non-detection will result when a setting is adopted to operate at the lower limit value during normal operation. Also, if the determination value is set to less than $1/10$ of the lower limit value during normal operation, it is possible that accurate detection cannot be performed due to the very small voltage value, resulting in erroneous detection.

However, since the determination value is set within a range of voltage values corresponding to the current that flows in a range from $1/10$ or more to $9/10$ or less with respect to the lower limit value of the current amount that flows through the light emitting element during normal operation, it is possible to distinguish overcurrent detection, non-detection, erroneous detection, and the like from abnormality of the first switching element, while preventing non-detection.

In the above light emission control device, a configuration may be adopted in which the light source circuit includes an inductor coupled between the second power supply node and the first switching element, a smoothing capacity coupled in parallel with the first resistor, the light emitting element, and the first switching element between the inductor and the first power supply node, a second switching element coupled between the inductor and the second power supply node, and a rectifier diode coupled in parallel with the first resistor, the light emitting element, the first switching element, and the inductor between the second switching element and the first power supply node, and the light emission control circuit outputs a second control signal that controls on/off of the second switching element, and sets the second control signal to a second drive stoppage state that inactivates the second control signal, and when the first control signal has also been set to the first drive stoppage state that inactivates the first control signal, the logic determination circuit outputs the error signal before the first potential difference becomes less than the determination value.

In this light emission control device, the light emission control circuit monitors the potential difference between both ends of the first resistor, and adjusts the on time of the second switching element. Also, the second switching element changes the voltage value applied to both ends of the inductor, and the smoothing capacity stabilizes the current generated by the inductor. Also, the light emission control circuit controls the current amount that flows through the light emitting element such that the current amount is constant.

In a state where the first switching element is short-circuited and correct on/off operation control cannot be performed, the light emission control circuit inactivates both the first control signal and the second control signal. As a result, the first switching element and the second switching element enter the first drive stoppage state and the second drive stoppage state, respectively.

At this time, since energy is stored in the inductor, the current passes through the rectifier diode, and the current value stabilized by the smoothing capacitor flows through the light emitting element. When the second drive stoppage state continues, a state where no potential difference occurs between both ends of the inductor is set. Also, the energy stored in the inductor decreases, and the amount of current that flows through the light emitting element decreases over time. Therefore, the detection time in which the first potential difference is at least the determination value is shortened.

However, by the logic determination circuit outputting an error signal during the detection time, the first switching element is short-circuited even with a driving method in which not only the first switching element but also the second switching element is set to an inactive state. Thus, it is possible to detect that correct on/off operation control has not been performed.

In the above light emission control device, a configuration may be adopted in which when outputting the error signal, the second control signal is fixed to an inactive state.

In this light emission control device, the light emission control device outputs an error signal when detecting that the first switching element is short-circuited and correct on/off operation control has not been performed. At this time, the first switching element is set to a half on state because the first switching element is short-circuited, and the resistance value of the first switching element increases.

Therefore, there is a concern that heat is generated by the current that flows through the first switching element until an error signal is output from the light emission control device to the outside and a command is returned from the outside. However, by fixing the second control signal to an inactive state when the light emission control device outputs the error signal, the heat generation of the first switching element can be suppressed.

Another aspect of the disclosure relates to a light source device including the light emission control device and the light source circuit described above.

In this light source device, the light emission control device has a function of outputting an error signal indicating that the first switching element is short-circuited. Therefore, in a manufacturing inspection process of the light source device, a short circuit of the first switching element on a printed circuit board can be easily found.

Another aspect of the disclosure relates to a projection-type video display device including the light source device described above and a processing device that controls the light source device.

In this projection-type video display device, the light emission control device has a function of outputting an error signal indicating that the first switching element is short-circuited. While the user is using the projection-type video display device, even if the first switching element is short-circuited, the light emission control device outputs an error signal and the processing device receives the error signal, and thus error information can be provided to the user.

What is claimed is:

1. A light emission control device that controls a first switching element of a light source circuit including a first resistor, a light emitting element, and the first switching element coupled in series between a first power supply node and a second power supply node set to a lower potential than the first power supply node, the light emission control device comprising:
   a detection circuit that compares a first potential difference that is a potential difference between both ends of the first resistor with a determination value;
   a light emission control circuit that outputs a first control signal that controls on/off of the first switching element; and
   a logic determination circuit that determines whether or not the first switching element is short-circuited, wherein
   the light emission control circuit sets the first control signal to a first drive stoppage state that inactivates the first control signal, and when the detection circuit has detected that the first potential difference is larger than the determination value, the logic determination circuit outputs an error signal,
   wherein the light source circuit includes an inductor coupled between the second power supply node and the first switching element, a smoothing capacity coupled in parallel with the first resistor, the light emitting element, and the first switching element between the inductor and the first power supply node, a second switching element coupled between the inductor and the second power supply node, and a rectifier diode coupled in parallel with the first resistor, the light emitting element, the first switching element, and the inductor between the second switching element and the first power supply node, and
   the light emission control circuit outputs a second control signal that controls on/off of the second switching element, and sets the second control signal to a second drive stoppage state that inactivates the second control signal, and when the first control signal has also been set to the first drive stoppage state that inactivates the first control signal, the logic determination circuit outputs the error signal before the first potential difference becomes less than the determination value.

2. The light emission control device according to claim 1, wherein the determination value is set within a range of voltage values corresponding to a current that flows in a range from $1/10$ or more to $9/10$ or less with respect to a lower limit value of a current amount that flows through the light emitting element during normal operation.

3. The light emission control device according to claim 1, wherein when outputting the error signal, the second control signal is fixed to an inactive state.

4. A light source device, comprising:
   the light emission control device according to claim 1; and
   the light source circuit.

5. A projection-type video display device, comprising: the light source device according to claim 4; and
   a processing device that controls the light source device.

* * * * *